United States Patent
Okuyama et al.

(10) Patent No.: US 10,338,441 B2
(45) Date of Patent: Jul. 2, 2019

(54) DISPLAY DEVICE

(71) Applicant: Japan Display Inc., Tokyo (JP)

(72) Inventors: Kentaro Okuyama, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 30 days.

(21) Appl. No.: 15/474,095

(22) Filed: Mar. 30, 2017

(65) Prior Publication Data

US 2017/0285420 A1  Oct. 5, 2017

(30) Foreign Application Priority Data

Apr. 1, 2016 (JP) ................................. 2016-074341

(51) Int. Cl.
| | |
|---|---|
| *G02F 1/137* | (2006.01) |
| *G02F 1/1335* | (2006.01) |
| *G02F 1/1337* | (2006.01) |
| *G02F 1/1343* | (2006.01) |
| *G02F 1/139* | (2006.01) |

(52) U.S. Cl.
CPC ...... *G02F 1/134336* (2013.01); *G02F 1/1393* (2013.01); *G02F 1/13725* (2013.01); *G02F 1/13737* (2013.01); *G02F 1/133528* (2013.01); *G02F 2001/13706* (2013.01); *G02F 2001/13712* (2013.01); *G02F 2001/133738* (2013.01); *G02F 2001/133742* (2013.01); *G02F 2001/134381* (2013.01); *G02F 2202/04* (2013.01); *G02F 2203/64* (2013.01)

(58) Field of Classification Search
CPC ........... G02F 1/133528; G02F 1/13737; G02F 1/13725
See application file for complete search history.

(56) References Cited

U.S. PATENT DOCUMENTS

| | | | |
|---|---|---|---|
| 2005/0057701 A1 | 3/2005 | Weiss | |
| 2008/0198281 A1* | 8/2008 | Klein | ..................... C09K 19/52 349/33 |
| 2009/0231530 A1* | 9/2009 | Nishimura | ............ G02F 1/1323 349/129 |
| 2012/0098875 A1 | 4/2012 | Shinkai et al. | |
| 2012/0262642 A1* | 10/2012 | Ikeda | .................... H01L 27/124 349/46 |
| 2014/0055835 A1 | 2/2014 | Shinkai et al. | |
| 2014/0240642 A1 | 8/2014 | Furukawa et al. | |
| 2014/0340728 A1 | 11/2014 | Taheri | |

(Continued)

FOREIGN PATENT DOCUMENTS

JP  2015-511329 A  4/2015

*Primary Examiner* — Jessica M Merlin
(74) *Attorney, Agent, or Firm* — Michael Best & Friedrich LLP

(57) ABSTRACT

According to one embodiment, a display device includes a first polarizing element, a second polarizing element, and a light-modulating layer located between the first polarizing element and the second polarizing element, each of the first polarizing element and the second polarizing element includes a guest-host liquid crystal layer and a control electrode in an active area including at least one sub-area, the guest-host liquid crystal layer including dye having anisotropy in absorptive power for visible light, the control electrode controlling an alignment direction of the dye in the sub-area.

14 Claims, 11 Drawing Sheets

(56) References Cited

U.S. PATENT DOCUMENTS

2015/0293402 A1\* 10/2015 Shinkai ............... G02F 1/13476
349/15
2015/0346536 A1\* 12/2015 Wang .................. G02F 1/13362
349/68
2017/0160592 A1    6/2017 Okuyama \* cited by examiner

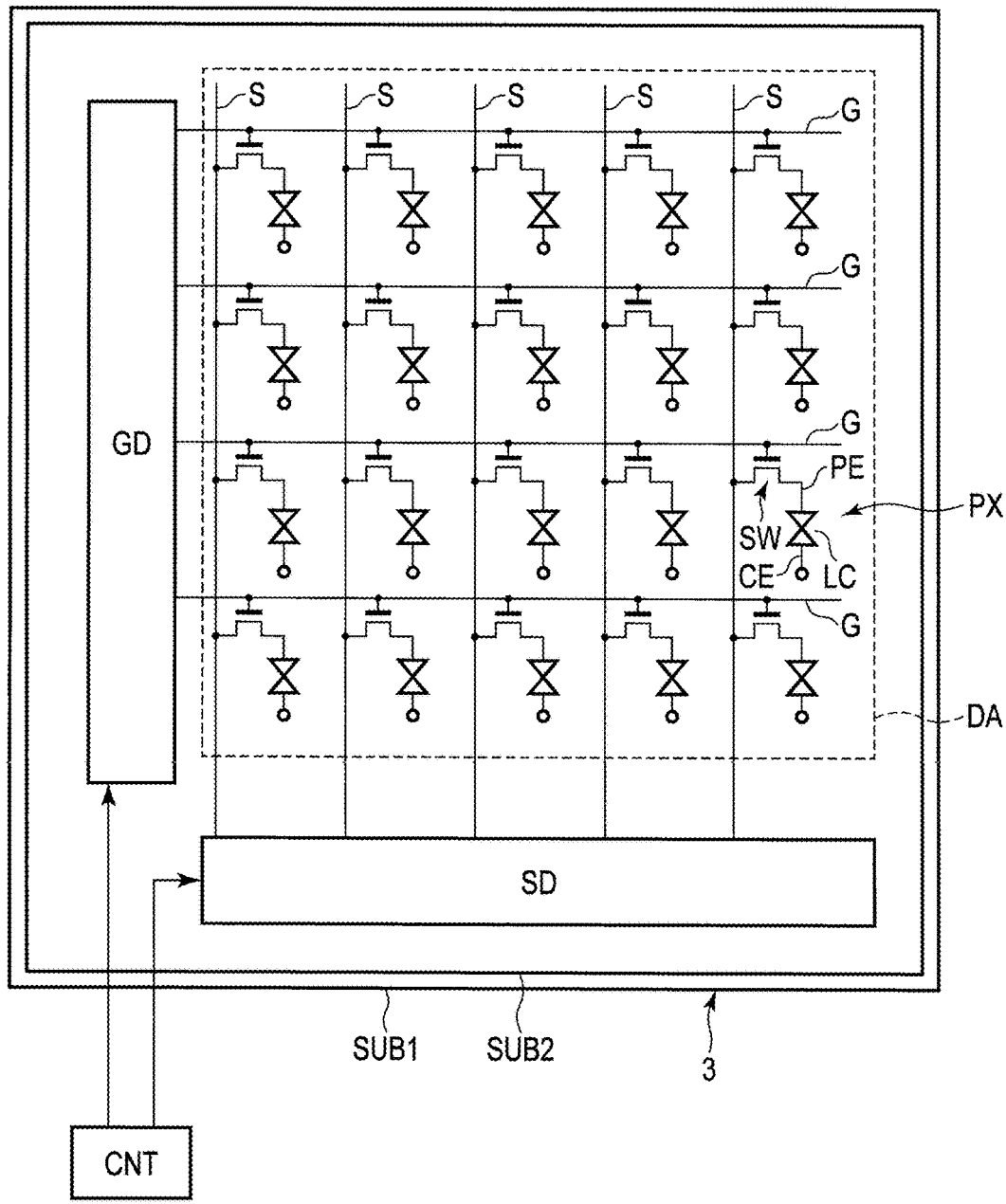
F I G. 7

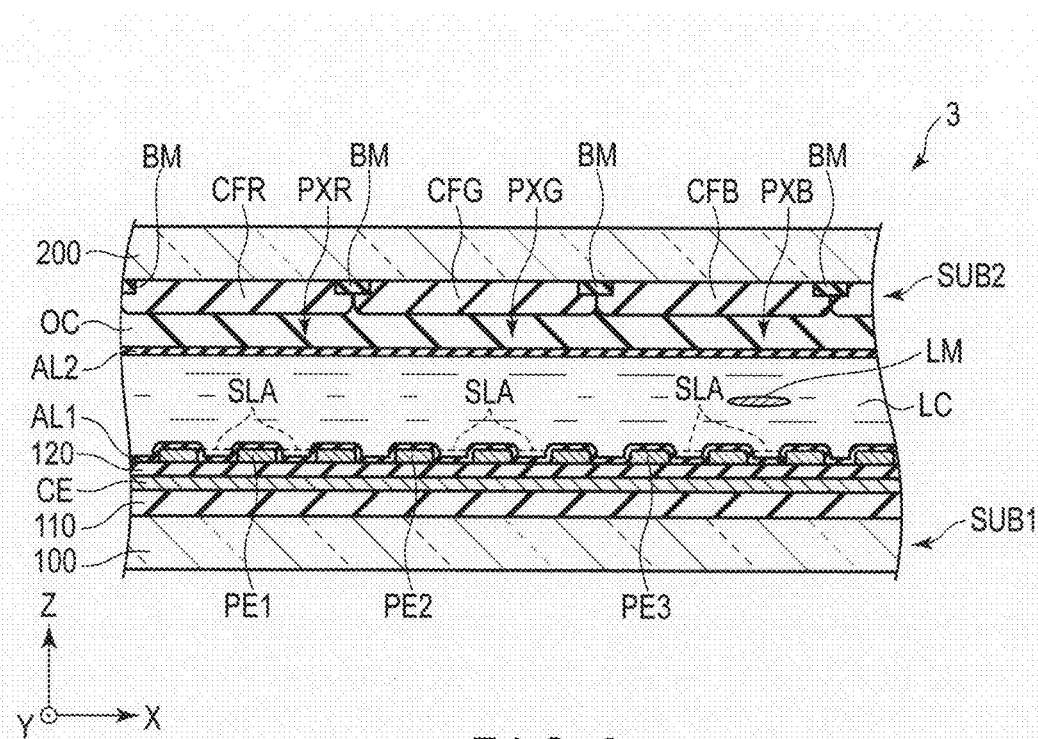
F I G. 8
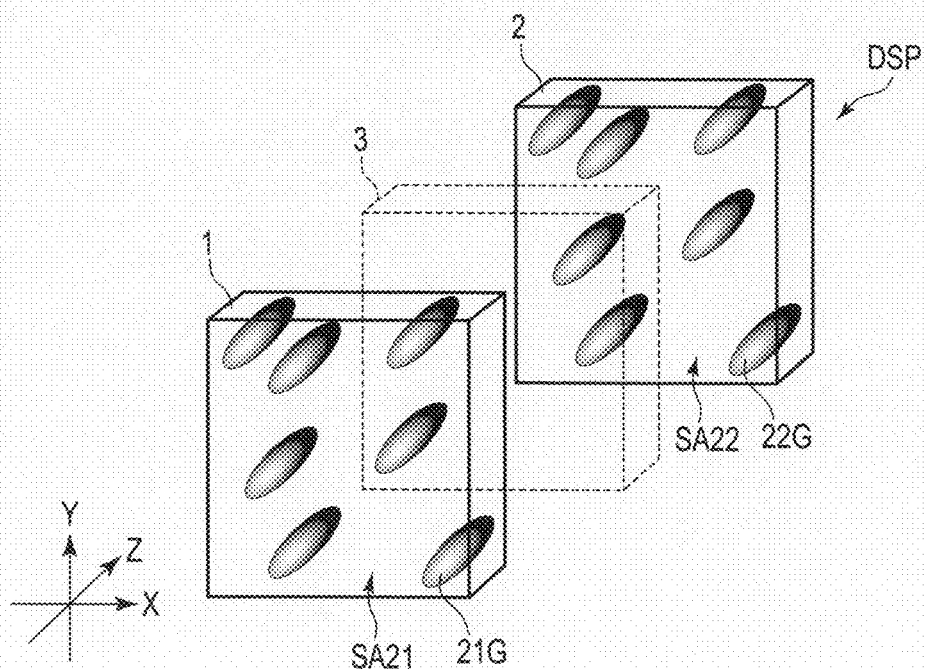
F I G. 9

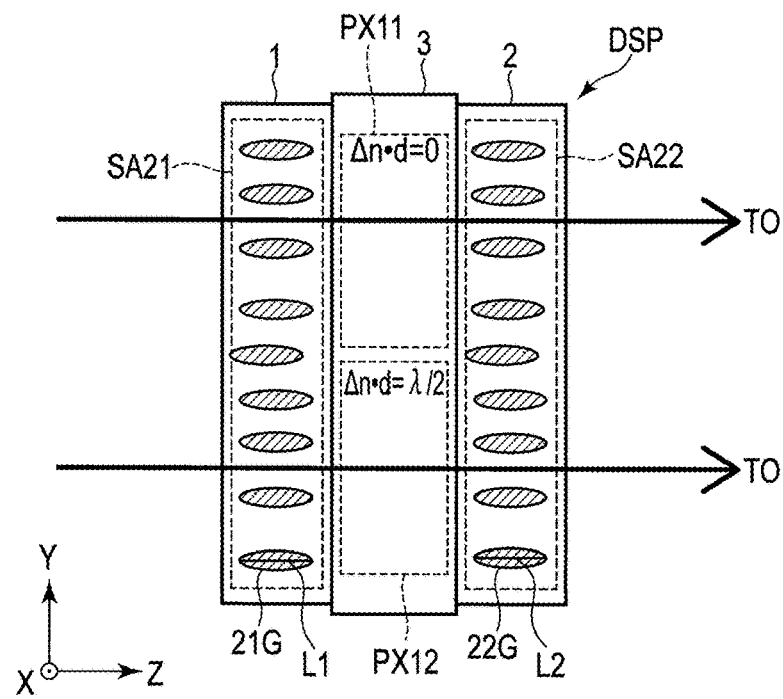
F I G. 10
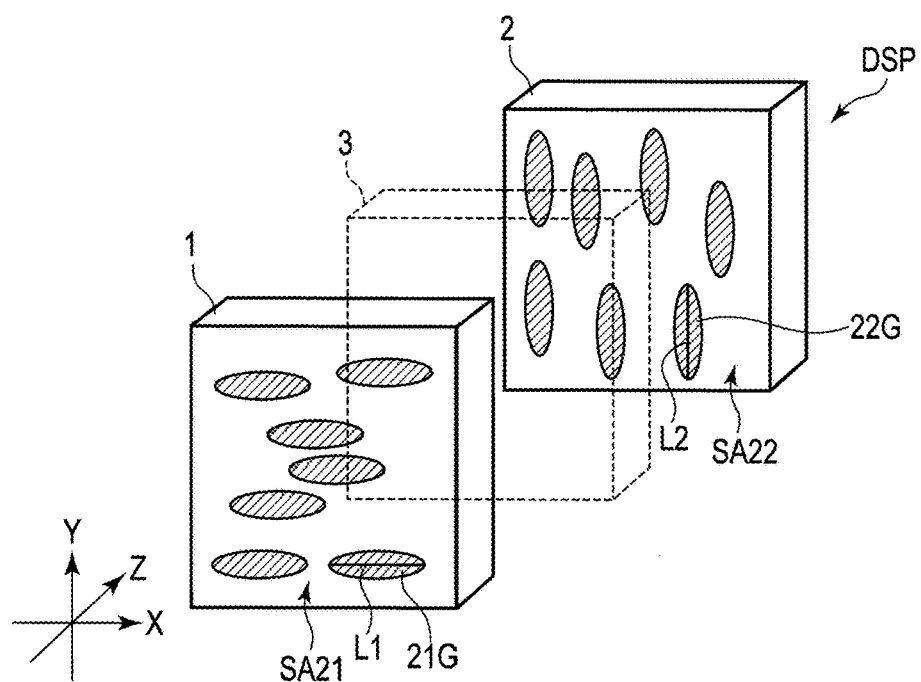
F I G. 11

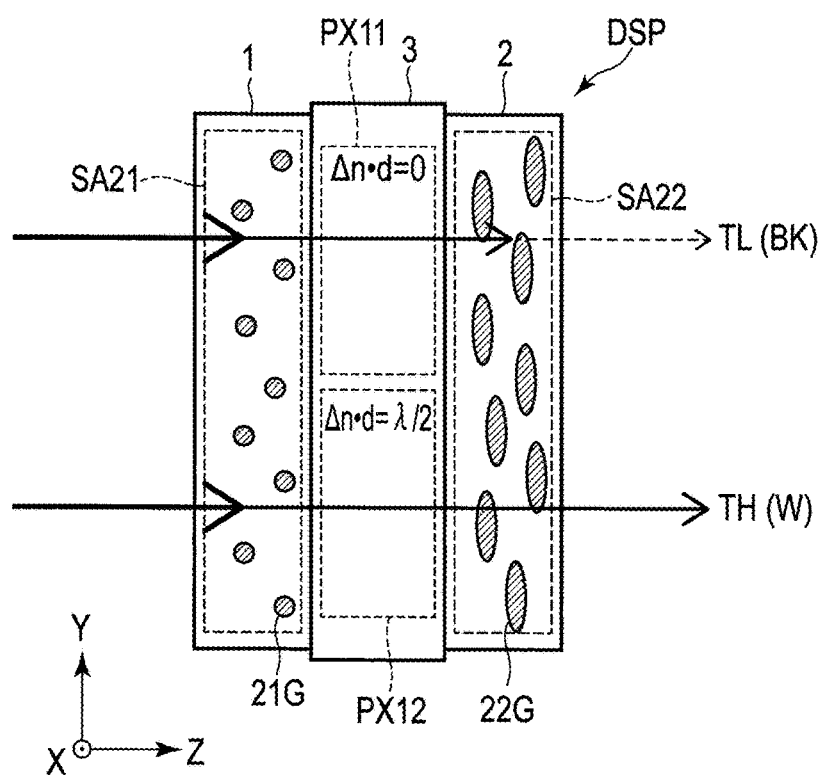
F I G. 12

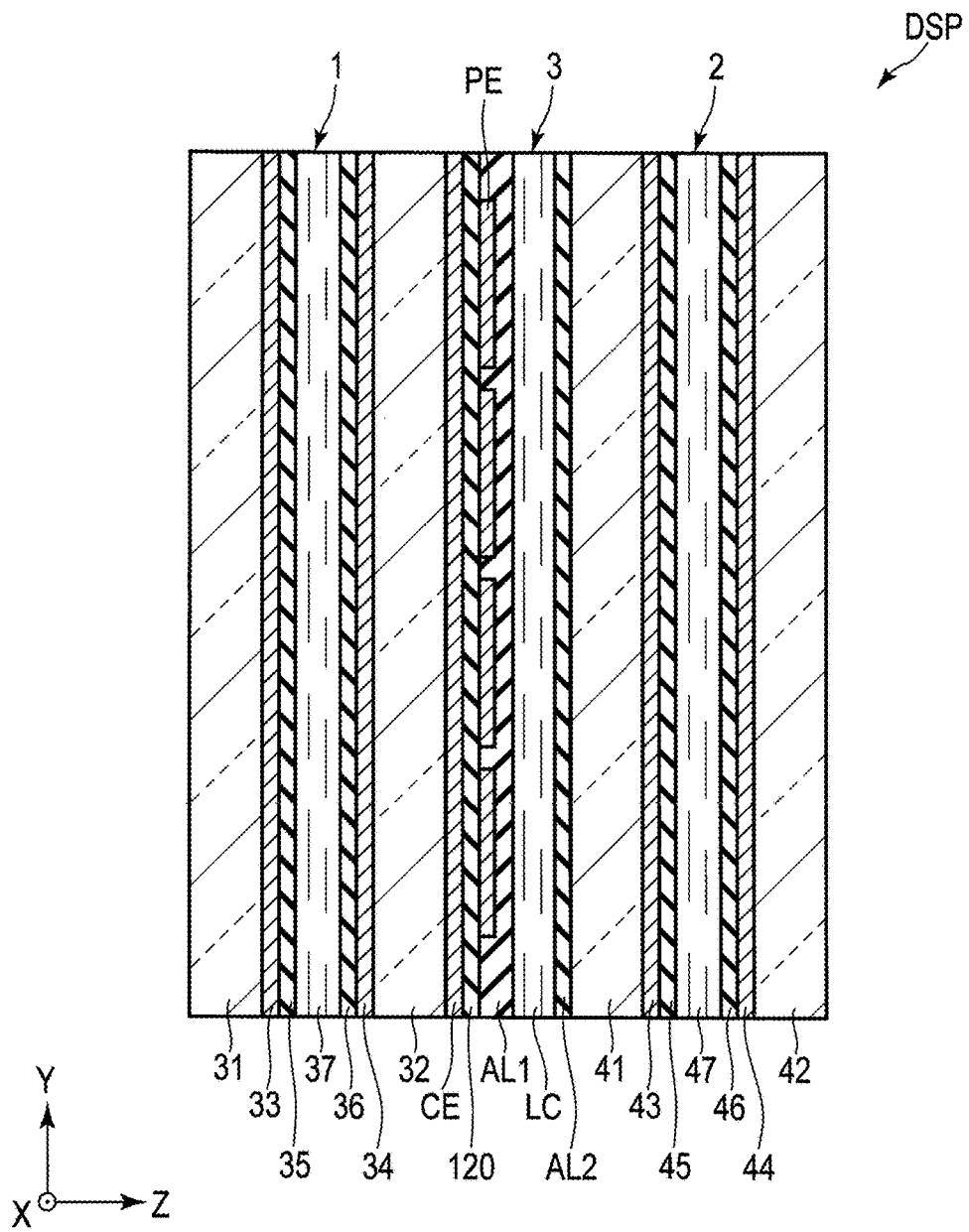
F I G. 14

DISPLAY DEVICE

CROSS-REFERENCE TO RELATED APPLICATIONS

This application is based upon and claims the benefit of priority from Japanese Patent Application No. 2016-074341, filed Apr. 1, 2016, the entire contents of which are incorporated herein by reference.

FIELD

Embodiments described herein relate generally to a display device.

BACKGROUND

Recently, various optical devices have been proposed. For example, an actively absorptive polarizer to which a guest-host type liquid crystal cell is applicable, a first statically reflective polarizer, an active polarization rotor, and an electronically light-controllable optical device comprising the first statically reflective polarizer have been proposed. In addition, a reflectance variable system or transmittance variable system comprising a variable polarizer to which a gust-host type liquid crystal cell is applicable has also been proposed. The optical device is required to improve the transmittance or transparency on one hand and to implement black display and improve the display quality on the other hand.

BRIEF DESCRIPTION OF THE DRAWINGS

FIG. 7 is an illustration showing a configuration example of the display panel 3 shown in FIG. 6.

FIG. 8 is a cross-sectional view showing a configuration example of the display panel 3 shown in FIG. 7.

FIG. 9 is an illustration for explanation of a transmission mode applied to the display device DSP of the embodiments.

FIG. 10 is an illustration for explanation of the transmittance of the display device DSP in the transmission mode shown in FIG. 9.

FIG. 11 is an illustration for explanation of a display mode applied to the display device DSP of the embodiments.

FIG. 12 is an illustration for explanation of transmittance of the display device DSP in the display mode shown in FIG. 11.

FIG. 14 is a cross-sectional view showing the display device DSP according to another example of the embodiments.

DETAILED DESCRIPTION

Figure 1:
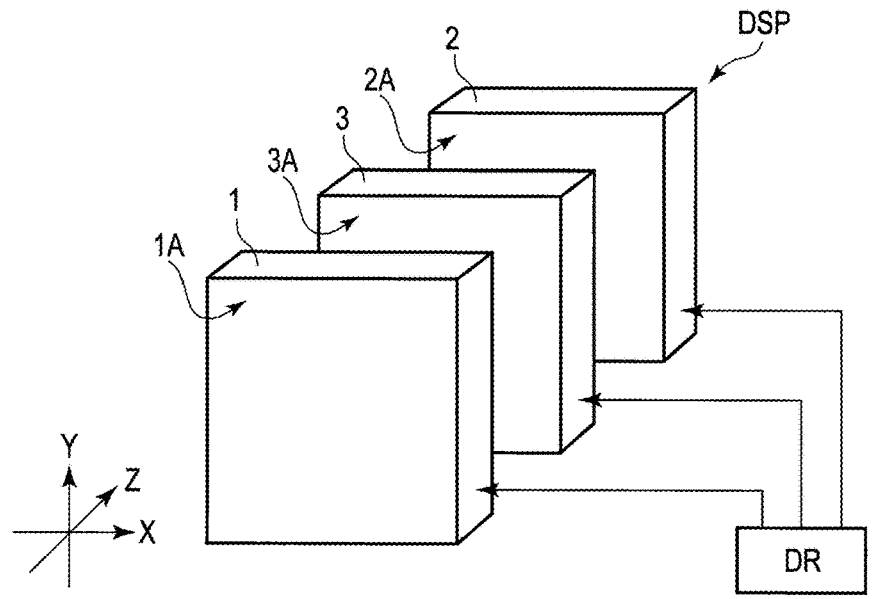
FIG. 1 is a perspective view showing a configuration example of a display device DSP of the embodiments.

In general, according to one embodiment, a display device includes: a first polarizing element; a second polarizing element; and a light-modulating layer located between the first polarizing element and the second polarizing element, each of the first polarizing element and the second polarizing element comprising a guest-host liquid crystal layer and a control electrode in an active area including at least one sub-area, the guest-host liquid crystal layer including dye having anisotropy in absorptive power for visible light, the control electrode controlling an alignment direction of the dye in the sub-area.

According to another embodiment, a display device include: a first polarizing element comprising first dye having a first long axis; a second polarizing element comprising second dye having a second long axis; and a display panel located between the first polarizing element and the second polarizing element, the display device having a display mode in which the first long axis and the second long axis intersect each other in a main surface of the display device, and a transmittance mode in which the first long axis and the second long axis are parallel to each other and intersect the main surface.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a perspective view showing a configuration example of a display device DSP of the embodiments. In the figure, a first direction X, a second direction Y and a third direction Z are orthogonal to each other but may intersect at an angle other than 90 degrees. The third direction Z corresponds to a direction of arrangement of the optical elements constituting the display device DSP.

The display device DSP comprises a first polarizing element 1, a second polarizing element 2, a display panel 3 and a driver DR.

Each of the first polarizing element 1, the second polarizing element 2 and the display panel 3 is formed in, for example, a flat plate shape. An X-Y plane defined by the first direction X and the second direction Y corresponds to a main surface of the display device DSP. The first polarizing element 1, the second polarizing element 2 and the display panel 3 have main surfaces 1A, 2A, and 3A, respectively, which are parallel to the X-Y plane. In the example illustrated, the third direction Z is parallel to each of the normals of the main surfaces 1A, 2A, and 3A. Each of the first polarizing element 1 and the second polarizing element 2 is configured to transmit or absorb the light incident on the own polarizing element. In other words, each of the first polarizing element 1 and the second polarizing element 2 is configured to change a transmission state of transmitting the light and an absorption state of absorbing the light.

The display panel 3 is located between the first polarizing element 1 and the second polarizing element 2. The display panel 3 is, for example, a liquid crystal display panel comprising a liquid crystal layer as a light-modulating layer but is not limited to this, and may be a display panel comprising a light-modulating layer having a function of varying a phase difference (or retardation) imparted to the light transmitted through the own body or a light-modulating layer having a function of varying in the X-Y plane a plane of vibration of the light transmitted through the own body.

The driver DR drives the first polarizing element 1, the second polarizing element 2, and the display panel 3. In other words, the driver DR controls change of the transmission state of transmitting the light and the absorption state of absorbing the light at each of the first polarizing element 1 and the second polarizing element 2. In addition, the driver DR controls the phase difference for the transmitted light on the display panel 3.

Figure 2:
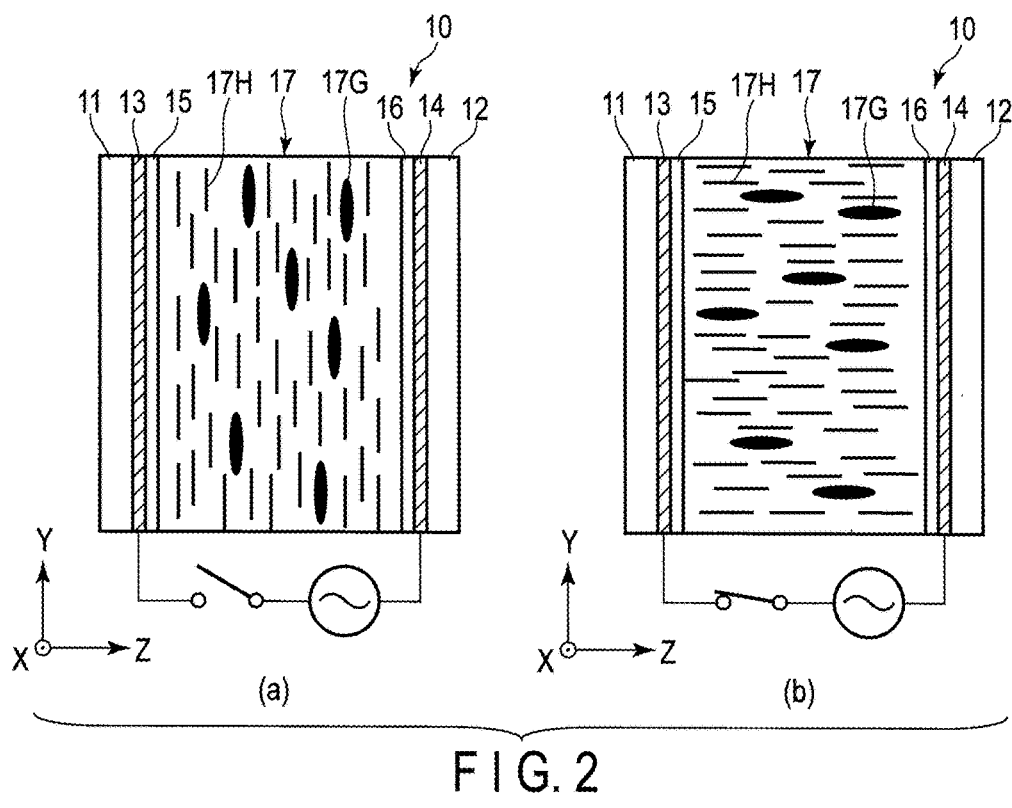
FIG. 2 is an illustration showing a configuration example of a polarizing element 10 applicable to a first polarizing element 1 and a second polarizing element 2 shown in FIG. 1.

FIG. 2 is an illustration showing a configuration example of a polarizing element 10 applicable to a first polarizing element 1 and a second polarizing element 2 shown in FIG. 1. The polarizing element 10 explained below is a configuration example applicable to both the first polarizing element 1 and the second polarizing element 2. FIG. 2(a) is a cross-sectional view showing the polarizing element 10 controlled in the first mode and FIG. 2(b) is a cross-sectional view showing the polarizing element 10 controlled in the second mode.

The polarizing element 10 comprises support substrates 11 and 12, a control electrode (first electrode) 13, a control electrode (second electrode) 14, alignment films 15 and 16, and a guest-host liquid crystal layer (hereinafter simply called a liquid crystal layer) 17. The control electrode 13 is located between the support substrate 11 and the alignment film 15, and the control electrode 14 is located between the support substrate 12 and the alignment film 16. The liquid crystal layer 17 is located between the alignment films 15 and 16 or between the control electrodes 13 and 14. The support substrates 11 and 12 are substrates which are transparent with respect to visible light such as glass substrates or resin substrates. The control electrodes 13 and 14 are formed of a transparent conductive material such as indium tin oxide (ITO) or indium zinc oxide (IZO). The liquid crystal layer 17 contains a dye (for example, dichroic dye) 17G which is anisotropic to the absorptive power (absorptivity) of visible light as guest molecules, and liquid crystal molecules 17H of nematic liquid crystal as host molecules. For example, the molecule of dye is shaped in a rod and, for example, azo dye, anthraquinone dye, perylene dye, merocyanine dye and the like are preferable as the dye. The rod-shaped dye has an absorptive power of absorbing a polarization component of vibrating in a long-axis direction of the molecule more strongly than a polarization component of vibrating in a short-axis direction of the molecule. In the liquid crystal layer 17, the dye can be aligned in a desired direction in accordance with the alignment of the liquid crystal. A configuration having a positive dielectric anisotropy and a configuration having a negative dielectric anisotropy can be employed as the liquid crystal layer 17. Each of the alignment films 15 and 16 may be horizontal alignment films having an alignment restriction force of urging the liquid crystal molecules 17H to be aligned in a direction parallel to the main surface or vertical alignment films having an alignment restriction force of urging the liquid crystal molecules 17H to be aligned in a direction parallel to a normal of the main surface.

A configuration example in which the liquid crystal layer 17 has a positive dielectric anisotropy and the alignment films 15 and 16 are horizontal alignment films will be explained.

FIG. 2(a) illustrates an off state in which a voltage is not applied to the control electrodes 13 and 14 opposed to sandwich the liquid crystal layer 17. At this time, the liquid crystal molecules 17H and the dye 17G in the liquid crystal layer 17 are subjected to initial alignment along the main surface (or the X-Y plane). In the example illustrated, the liquid crystal molecules 17H and the dye 17G are aligned such that their long axes oriented in a direction parallel to the second direction Y. In this case, the dye 17G absorbs a second polarization component parallel to the second direction Y more strongly than a first polarization component parallel to the first direction X, of the light made incident on the liquid crystal layer 17 in the third direction Z. The initial alignment direction of the liquid crystal molecules 17H and the dye 17G is determined based on alignment treatment directions of the alignment films 15 and 16. As the alignment treatment of the alignment films 15 and 16, rubbing treatment, optical alignment treatment and the like can be employed. In the example illustrated, the alignment treatment directions of the alignment films 15 and 16 are parallel to the second direction Y but may be opposite to each other or the same as each other. A state in which the long axis of the dye 17G is aligned along the main surface indicates not only a case where the long axis is completely parallel to the main surface, but also a case where the long axis is slightly angled to the main surface.

FIG. 2(b) illustrates an on state in which a voltage is applied to the control electrodes 13 and 14. At this time, an electric field is formed in a third direction Z, between the control electrodes 13 and 14, in the liquid crystal layer 17. The liquid crystal molecules 17H and the dye 17G in the liquid crystal layer 17 are aligned such that their long axes are oriented in a direction parallel to the electric field. In other words, the long axes of the respective liquid crystal molecules 17H and the dye 17G are aligned in a direction intersecting the main surface. For example, the long axis of each of the liquid crystal molecules 17H and the dye 17G is aligned in a direction parallel to the normal of the main surface, i.e., the third direction Z. In this case, the dye 17G hardly absorbs the first polarization component and the second polarization component of the light made incident on the liquid crystal layer 17 in the third direction Z. Even if the dye 17G absorbs part of the light, the absorptive power of the first polarization component is equivalent to the absorptive power of the second polarization component. A state in which the long axis of the dye 17G is aligned in a direction intersecting the main surface indicates not only a case where the long axis is completely parallel to the normal of the main surface, but also a case where the long axis is slightly angled to the normal of the main surface.

Figure 3:
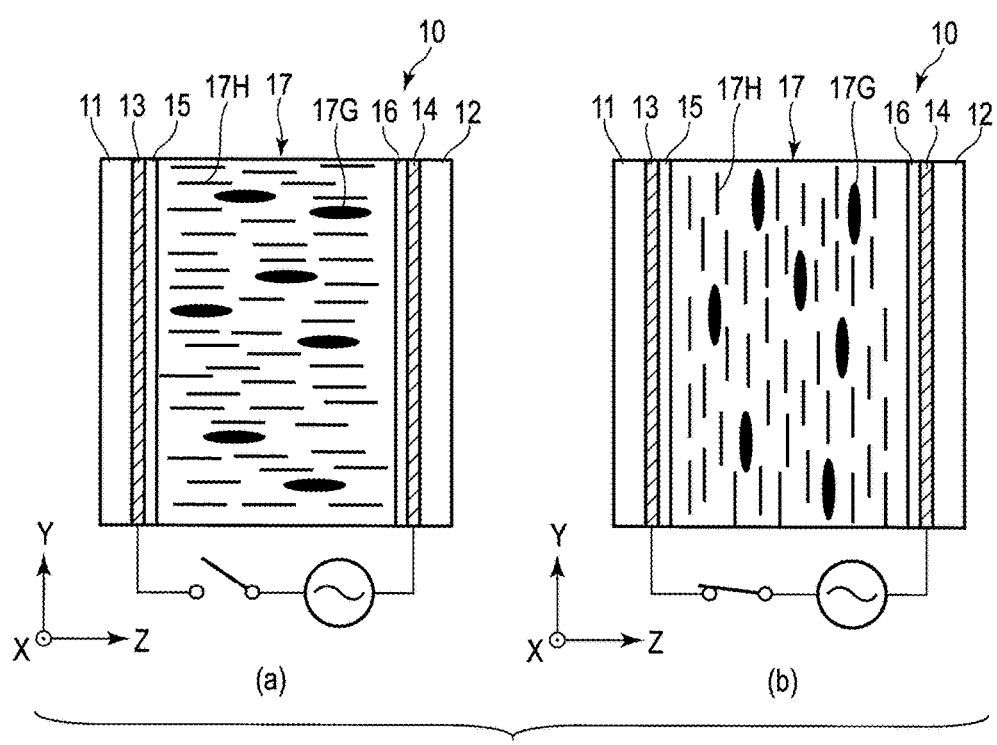
FIG. 3 is an illustration showing another configuration example of the polarizing element 10 applicable to the first polarizing element 1 and the second polarizing element 2 shown in FIG. 1.

FIG. 3 is an illustration showing another configuration example of the polarizing element 10 applicable to the first polarizing element 1 and the second polarizing element 2 shown in FIG. 1. FIG. 3(a) is a cross-sectional view showing the polarizing element 10 controlled in the second mode and FIG. 3(b) is a cross-sectional view showing the polarizing element 10 controlled in the first mode.

The configuration example shown in FIG. 3 is different from the configuration example shown in FIG. 2 with respect to a feature that the liquid crystal layer 17 has a negative dielectric anisotropy and the alignment films 15 and 16 are vertical alignment films.

FIG. 3(a) illustrates an off state in which a voltage is not applied to the control electrodes 13 and 14. At this time, the liquid crystal molecules 17H and the dye 17G in the liquid crystal layer 17 are subjected to initial alignment in the third direction Z parallel to the normal of the main surface. In this case, the dye 17G hardly absorbs the first polarization component and the second polarization component of the light made incident on the liquid crystal layer 17 along the third direction Z.

FIG. 3(b) illustrates an on state in which a voltage is applied to the control electrodes 13 and 14. At this time, an electric field is formed in a third direction Z, between the control electrodes 13 and 14, in the liquid crystal layer 17. An inclined electric field angled to the third direction Z is desirably included in the electric field. This inclined electric field can be formed by forming protrusions between the support substrate 11 and the liquid crystal layer 17, between the support substrate 12 and the liquid crystal layer 17 and the like or forming slits in the control electrodes 13 and 14. The protrusions and slits are often called inclined electric field forming portions. In addition, an effect similar to that of the inclined electric field can also be obtained by preliminarily forming pre-tilt on the vertical alignment film by rubbing treatment, and restricting the orientation of inclination of the liquid crystal layer 17 by the longitudinal electric field formed between the control electrodes 13 and 14. The liquid crystal molecules 17H and the dye 17G in the liquid crystal layer 17 are aligned such that their long axes are oriented in a direction intersecting the electric field. In other words, the liquid crystal molecules 17H and the dye 17G are aligned to be oriented in a direction parallel to the X-Y plane. In the example illustrated, the dye 17G is aligned such that its long axis is oriented in the direction parallel to the second direction Y, and absorbs the second polarization component more strongly than the first polarization component, of the light made incident on the liquid crystal layer 17.

In the present embodiments, a mode of aligning the dye 17G in the direction parallel to the main surface as shown in FIG. 2(a) and FIG. 3(b) is defined as a first mode, and a mode of aligning the dye 17G in the direction parallel to the normal of the main surface as shown in FIG. 2(b) and FIG. 3(a) is defined as a second mode. In the first mode, however, all the dyes 17G do not need to be aligned in the direction completely parallel to the main surface, but the dye 17G may be aligned so as to express difference in absorptive power of both the first polarization component and the second polarization component with respect to an average absorptive power of the dye 17G contained in the liquid crystal layer 17. In the second mode, all the dyes 17G do not need to be aligned in the direction completely parallel to the normal of the main surface, but the dye 17G may be aligned so as to hardly absorb the first polarization component and the second polarization component or to be considered to have substantially equivalent absorptive power of the first polarization component and the second polarization component with respect to the average absorptive power of the dye 17G contained in the liquid crystal layer 17. Thus, a pair of control electrodes 13 and 14 control the first mode and the second mode in accordance with the voltage applied to the liquid crystal layer 17 between the control electrodes.

In the second mode, i.e., the state in which the magnitude of absorption is hardly varied irrespective of the polarization component, the transparency is more excellent as the dye 17G is aligned in the direction parallel to the normal of the main surface. In other words, aligning the dye 17G by the alignment restriction force of the vertical alignment film as shown in FIG. 3(a) is preferable to aligning the dye 17G by the electric field as shown in FIG. 2(b), from the viewpoint of enhancing the transparency. This is because the alignment of the dye 17G in close vicinity to the alignment film surface cannot easily be changed, the applied voltage is limited practically, and fluctuation of the liquid crystal is hardly influenced by the optical characteristics in the configuration example shown in FIG. 3(a) as compared with the configuration example shown in FIG. 2(b).

Next, a configuration example of the control electrodes 13 and 14 applicable to the polarizing element 10 will be explained.

Figure 4:
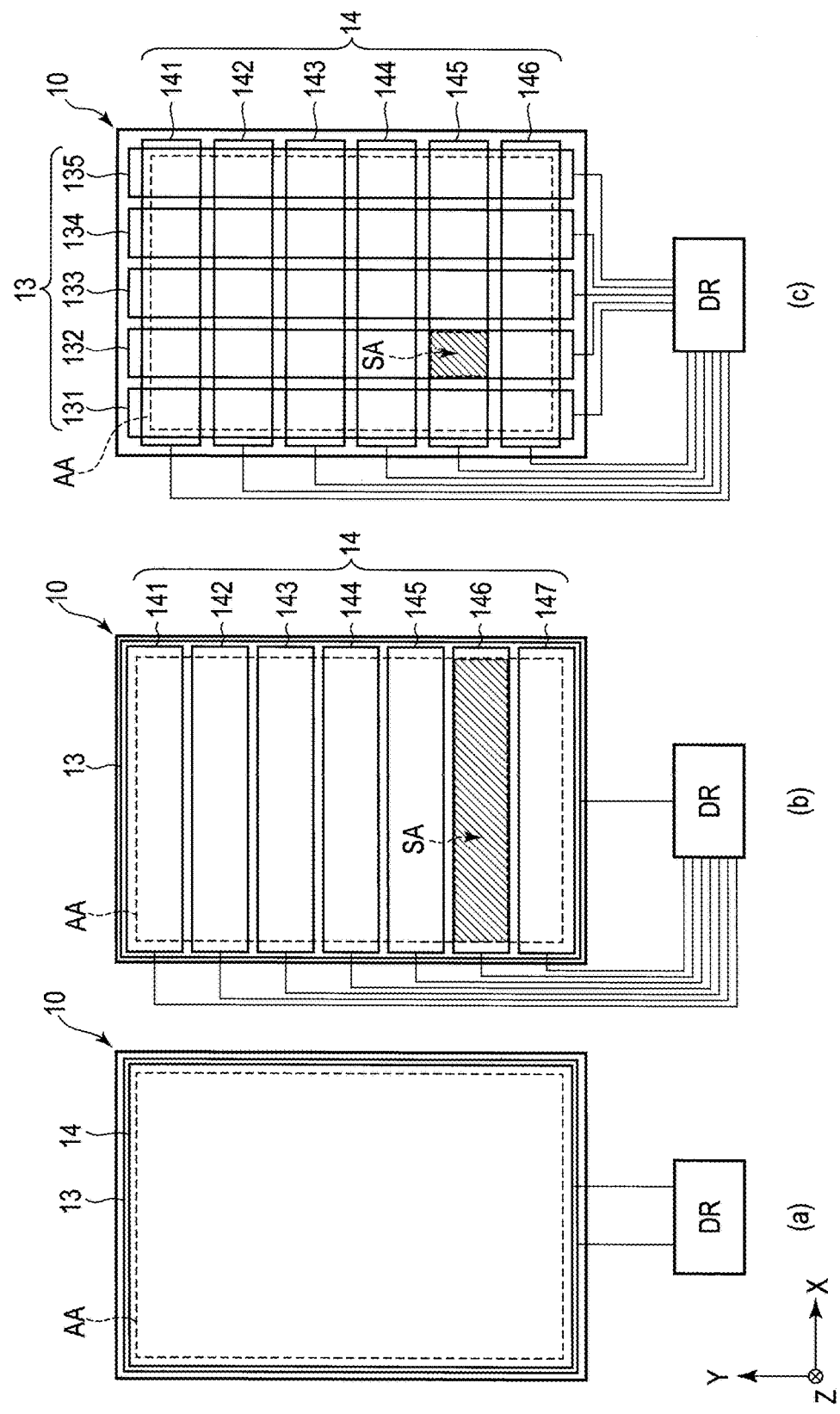
FIG. 4 is a plan view showing a configuration example of control electrodes 13 and 14.

FIG. 4 is a plan view showing a configuration example of control electrodes 13 and 14. The polarizing element 10 includes an active area AA in which the light can be transmitted, in an X-Y plane. For example, the active area AA is shaped in a rectangle having short sides extending along the first direction and long sides extending along the second direction and the shape is not limited to the example illustrated but may be the other polygon or a circle, an ellipsoid or the like.

In the configuration example shown in FIG. 4(a), each of the control electrodes 13 and 14 is composed of a single sheet electrode elongated over the whole of the active area AA without a rip. As explained above, the control electrodes 13 and 14 are opposed to sandwich the liquid crystal layer 17. The driver DR is electrically connected to each of the control electrodes 13 and 14. In this configuration example, the alignment direction of the dye 17G of the liquid crystal layer 17 is controlled on the whole of the active area AA by controlling the voltage applied to the control electrodes 13 and 14 by the driver DR. The polarizing element 10 can thereby control the first mode (i.e., the mode of mainly transmitting the light) and the second mode (i.e., the mode of mainly absorbing the light) on the whole of the active area AA.

The configuration example shown in FIG. 4(b) is different from the configuration example shown in FIG. 4(a) with respect to a feature that the active area AA of the polarizing element 10 includes a plurality of strip-shaped sub-areas SA. The control electrode 13 is composed of a single sheet electrode, similarly to the configuration example shown in FIG. 4(a). The control electrode 14 is composed of strip electrodes 141 to 147 spaced apart from each other. In the example illustrated, the strip electrodes 141 to 147 are shaped in a rectangle elongated in the first direction X and arranged in the second direction Y so as to be spaced apart from each other. The control electrode 13 and the strip electrodes 141 to 147 are opposed to each other. The driver DR is electrically connected to the control electrodes 13 and also electrically connected to each of the strip electrodes 141 to 147. A sub-area SA corresponds to an overlaid portion in which the control electrodes 13 and one of the strip electrodes 141 to 147 are overlaid in the X-Y plane. In the example illustrated, each sub-area SA is a strip-shaped region elongated in the first direction X.

The strip electrodes 141 to 147 may be elongated in the second direction Y and arranged in the first direction X so as to be spaced apart from each other. In this configuration example, one of the control electrodes 13 and 14 is composed of a sheet electrode and the other is composed of a plurality of strip electrodes, but the control electrode 13 may be composed of strip electrodes and the control electrode 14 may be composed of a single sheet electrode.

In this configuration example, the alignment direction of the dye 17G is controlled in each of the sub-areas SA by controlling a voltage applied to the strip electrodes 141 to 147 independently by the driver DR. The polarizing element 10 can thereby control the first mode and the second mode in each sub-area SA. It should be noted that the polarizing element 10 of this configuration example can control the first mode and the second mode on the whole of the active area AA by driving all the strip electrodes 141 to 147 together.

The configuration example shown in FIG. 4(c) is different from the configuration example shown in FIG. 4(a) with respect to a feature that the active area AA of the polarizing element 10 includes a plurality of sub-areas SA arrayed in a matrix. The control electrode 13 is composed of strip electrodes 131 to 135 spaced apart from each other. The control electrode 14 is composed of strip electrodes 141 to 146 spaced apart from each other. The strip electrodes 131 to 135 correspond to the first strip electrodes and the strip electrodes 141 to 146 correspond to the second strip electrodes. In the example illustrated, the strip electrodes 131 to 135 are elongated in the second direction Y and arranged in the first direction X so as to be spaced apart from each other. The strip electrodes 141 to 146 may be elongated in the first direction X and arranged in the second direction Y so as to be spaced apart from each other. The strip electrodes 131 to 135 and the strip electrodes 141 to 146 are opposed to each other. The driver DR is electrically connected to each of the strip electrodes 131 to 135 and also connected to each of the strip electrodes 141 to 146. Each of the sub-areas SA corresponds to a square intersection portion in which one of the strip electrodes 131 to 135 and one of the strip electrodes 141 to 146 intersect in the X-Y plane. In the example illustrated, the sub-areas SA are arrayed in a matrix in the first direction X and the second direction Y.

In this configuration example, the alignment direction of the dye 17G is controlled in each of the sub-areas SA by controlling a voltage applied to the strip electrodes 131 to 135 and 141 to 146 independently by the driver DR. The polarizing element 10 can thereby control the first mode and the second mode in each sub-area SA. It should be noted that the polarizing element 10 of this configuration example can control the first mode and the second mode on the whole of the active area AA by driving all the strip electrodes 131 to 135 and 141 to 146 together.

In the configuration example, the shape of the sub-area SA is not limited to a rectangle, but may be the other polygons, a circle, an ellipsoid or any arbitrary shape. Shapes of the control electrodes 13 and 14 which define the shapes of the sub-areas SA can be selected freely.

Figure 5:
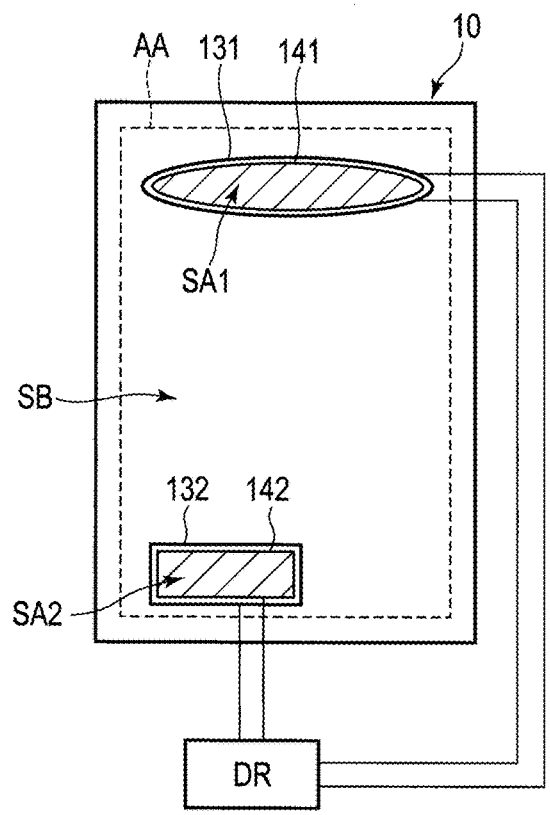
FIG. 5 is a plan view showing another configuration example of the control electrodes 13 and 14.

FIG. 5 is a plan view showing another configuration example of the control electrodes 13 and 14. The configuration example shown in FIG. 5 is different from the configuration example in FIG. 4 with respect to a feature that sub-areas SA1 and SA2 are locally formed in the active area AA. The sub-area SA does not need to be formed on the whole of the active area AA, unlike the configuration example shown in FIG. 4, and can be optionally provided in a region where optical transmission or absorption needs to be controlled.

In the example illustrated, the active area AA includes the sub-areas SA1 and SA2 and a non-control area SB. The sub-area SA1 is an elliptic region and is formed in a region where a pair of control electrodes 131 and 141 are opposed to each other. The sub-area SA2 is an elongated region and is formed in a region where a pair of control electrodes 132 and 142 are opposed to each other. None of the control electrodes is formed in the non-control area SB. In the example illustrated, a total size of the sub-areas SA1 and SA2 is smaller than a total size of the non-control area SB in the active area AA. However, the total size of the sub-areas SA1 and SA2 may be larger than the total size of the non-control area SB.

In this configuration example, the sub-areas SA1 and SA2 correspond to the control areas where the first mode and the second mode can be controlled. In contrast, the non-control area SB other than the sub-area SA is maintained in the second mode and most of the light is transmitted in the area. In other words, the non-control area SB corresponds to a transmissive region.

The sub-areas SA of the polarizing element 10 are driven in the passive mode in the configuration example shown in FIG. 4 and FIG. 5 but may be driven in an active mode. In other words, the polarizing element 10 may comprise an active element in each sub-area SA and at least one of the control electrodes 13 and 14 may be electrically connected with the active element. In this case, the first mode and the second mode can be controlled independently in each sub-area SA.

Figure 6:
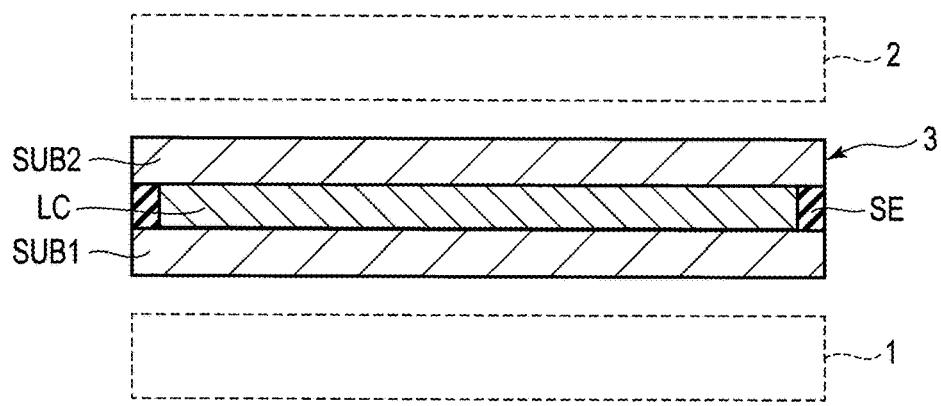
FIG. 6 is a cross-sectional view showing a configuration example of a display panel 3 shown in FIG. 1.

FIG. 6 is a cross-sectional view showing a configuration example of a display panel 3 shown in FIG. 1. A liquid crystal display device is explained as an example of the display device 3.

The display panel 3 includes a first substrate SUB1, a second substrate SUB2 and a light-modulating layer (liquid crystal layer) LC. The first substrate SUB1 and the second substrate SUB2 are bonded to each other by a sealing member SE. The light-modulating layer LC is held between the first substrate SUB1 and the second substrate SUB2. The first substrate SUB1 is located on a side opposed to the first polarizing element 1. The second substrate SUB2 is located on a side opposed to the second polarizing element 2. The light-modulating layer LC is located between the first polarizing element 1 and the second polarizing element 2.

FIG. 7 is an illustration showing a configuration example of the display panel 3 shown in FIG. 6.

The display panel 3 includes a display area DA where an image is displayed. The display area DA is composed of pixels PX arrayed in a matrix. The first substrate SUB1 includes scanning lines G (also called gate lines), and signal lines S (also called data lines or source lines) intersecting the scanning lines G. Each scanning line G is drawn outside the display area DA to be connected to a scanning line driver GD. Each signal line S is drawn outside the display area DA to be connected to a signal line driver SD. The scanning line driver GD and the signal line driver SD are connected to a controller CNT. The controller CNT controls the scanning line driver GD and the signal line driver SD, based on data of the image displayed in the display area DA. Since the scanning lines G and the signal lines S are formed of an opaque metal material, the lines are desirably made as narrow as possible from the viewpoint of enhancing the transmittance of the display panel 3. In addition, the surface of the scanning lines G and the signal lines S is desirably subjected to antireflection treatment from the viewpoint if reducing an influence of the reflected light on the scanning lines G and the signal lines S to the display images.

Each of the pixels PX comprises a switching element SW (for example, thin-film transistor), a pixel electrode PE, a common electrode CE and the like. The switching element SW is electrically connected to the scanning line G and the signal line S. The switching element SW may be a top-gate type switching element or a bottom-gate type switching element and may employ a single-gate structure or a double-gate structure. In addition, a semiconductor layer of the switching element SW can be formed of amorphous silicon, polycrystalline silicon or oxide semiconductor. The semiconductor layer is desirably formed of the oxide semiconductor from the viewpoint of reducing leakage due to the incident light to the semiconductor layer. Alternatively, the semiconductor layer is desirably formed of the transparent oxide semiconductor from the viewpoint of enhancing the transmittance of the display panel 3. The pixel electrode PE is electrically connected to the switching element SW. The common electrode CE is opposed to the pixel electrodes PE. The pixel electrodes PE and the common electrode CE function as drive electrodes which drive the light-modulating layer LC. The pixel electrodes PE and the common electrode CE are formed of a transparent conductive material such as ITO and IZO. The pixel electrodes PE and the common electrode CE desirably do not contain an opaque metal material from the viewpoint of enhancing the transmittance of the display panel 3.

Detailed explanations of the configuration of the display panel 3 are omitted here, but, the common electrode CE is disposed on the second substrate SUB2 while the pixel electrodes PE are disposed on the first substrate SUB1 in a mode of mainly using a longitudinal electric field along a direction of the normal of the display panel 3 or in a mode of mainly using an inclined electric field angled to the normal. In addition, in a mode of mainly using a lateral electric field along the main surface 3A of the display panel 3, both the pixel electrode PE and the common electrode CE are disposed on the first substrate SUB1 or the second substrate SUB2.

The mode using the longitudinal electric field is, for example, a twisted nematic (TN) mode, a polymer dispersed liquid crystal (PDLC) mode, an optically compensated bend (OCB) mode, an electrically controlled birefringence (ECB) mode, or a vertical aligned (VA) mode. In addition, the mode using the lateral electric field is, for example, a fringe field switching (FFS) mode, an in-plane switching (IPS) mode or the like. The mode using the longitudinal electric field and the mode using the lateral electric field may be combined.

The display panel 3 has, for example, a transmissive display function of displaying an image by urging the light traveling from the first substrate SUB1 toward the second substrate SUB2 or the light traveling from the second substrate SUB2 toward the first substrate SUB1 to be selectively transmitted in the whole of the display area DA. The display panel 3 may have a reflective display function of displaying an image by urging the light traveling from the first substrate SUB1 toward the second substrate SUB2 or the light traveling from the second substrate SUB2 toward the first substrate SUB1 to be selectively reflected in a part of the display area DA. In addition, at least several pixels PX located in the display area DA may have both the transmissive display function and the reflective display function.

FIG. 8 is a cross-sectional view showing a configuration example of the display panel 3 shown in FIG. 7. A cross-sectional structure of the display panel 3 using the FFS mode which is one of the display modes using the lateral electric field will be explained in brief. In the example illustrated, the display panel 3 includes a red pixel PXR which exhibits a red color, a green pixel PXG which exhibits a green color, and a blue pixel PXB which exhibits a blue color, in the display area DA, but may include a pixel which exhibits the other color. For example, the display panel 3 desirably includes a pixel which exhibits a white color or transparent pixel from the viewpoint of enhancing the transmittance of the display panel 3.

The first substrate SUB1 includes a first insulating substrate 100, a first insulating film 110, the common electrode CE, a second insulating film 120, pixel electrodes PE1 to PE3, a first alignment film AL1 and the like. The common electrode CE extends across the red pixel PXR, the green pixel PXG and the blue pixel PXB. Each of a pixel electrode PE1 of the red pixel PXR, a pixel electrode PE2 of the green pixel PXG, and a pixel electrode PE3 of the blue pixel PXB is opposed to the common electrode CE and includes slits SLA. In the example illustrated, the common electrode CE is located between the first insulating film 110 and the second insulating film 120, and the pixel electrodes PE1 to PE3 are located between the second insulating film 120 and the first alignment film AL1. The pixel electrodes PE1 to PE3 may be located between the first insulating film 110 and the second insulating film 120, and the common electrode CE may be located between the second insulating film 120 and the first alignment film AL1. In this case, the slits SLA are formed on the common electrode CE.

The second substrate SUB2 includes a second insulating substrate 200, a light-shielding layer BM, color filters CFR, CFG and CFB, an overcoat layer OC, a second alignment film AL2, and the like. The color filters CFR, CFG and CFB are opposed to the pixel electrodes PE1 to PE3, respectively, through the light-modulating layer LC. The color filter CFR is a red color filter, the color filter CFG is a green color filter, and the color filter CFB is a blue color filter.

The color filters CFR, CFG and CFB are formed on the second substrate SUB2 in the example illustrated, but may be formed on the first substrate SUB1. The light-shielding layer BM is located between adjacent color filters but desirably is not disposed from the viewpoint of enhancing the transmittance of the display panel 3. If the color display is unnecessary, the transmittance of the display panel 3 can be further enhanced by disposing no color filters.

The light-modulating layer LC is sealed between the first alignment film AL1 and the second alignment film AL2. The first alignment film AL1 and the second alignment film AL2 are horizontal alignment films.

In an off state in which an electric field is not formed between a pixel electrode PE and a common electrode CE, the liquid crystal molecules LM contained in the light-modulating layer LC are set in an initial alignment in a direction substantially parallel to the X-Y plane by an alignment restriction force of the first alignment film AL1 and the second alignment film AL2. In an on state in which the electric field is formed between the pixel electrodes PE and the common electrode CE, the liquid crystal molecules LM are aligned in a direction different from the initial alignment direction in the X-Y plane. An average alignment direction of the liquid crystal molecules LM is determined in accordance with the magnitude of the electric field or the potential difference between the pixel electrodes PE and the common electrode CE. In the light-modulating layer LC, the retardation $\Delta n \cdot d$ assigned for the linearly polarized light transmitted through the own layer is, for example, zero in the off state and $\lambda/2$ at maximum in the on state. $\Delta n$ represents refractive anisotropy of the light-modulating layer LC, d represents a substantial thickness (length in the third direction Z) of the light-modulating layer LC, and $\lambda$ represents the wavelength of the light transmitted through the light-modulating layer LC. In other words, the retardation of the light-modulating layer LC can be adjusted within a range from zero to $\lambda/2$ in accordance with the magnitude of the electric field, and the like. For this reason, the linearly polarized light transmitted through the light-modulating layer LC in the off state is transmitted through the display panel 3 while maintaining its polarized state. In addition, the linearly polarized light transmitted through the light-modulating layer LC in the on state is converted into linearly polarized light in the polarized state in which its axis of polarization is rotated at 90 degrees in the X-Y plane.

FIG. 9 is an illustration for explanation of a transmission mode applied to the display device DSP of the embodiments. Two sub-areas SA21 and SA22 of the sub-areas disposed in the first polarizing element 1 and the second polarizing element 2 will be explained here. The sub-areas SA21 and SA22 are opposed to sandwich the display panel 3. For example, the sub-areas SA21 and SA22 have a positional relationship of being overlaid in the X-Y plane.

Each of the first polarizing element 1 and the second polarizing element 2 is controlled in the second mode, and the dye 21G included in the first polarizing element 1 and the dye 22G included in the second polarizing element 2 are aligned parallel to each other. In other words, the dye 21G included in the first polarizing element 1 and the dye 22G included in the second polarizing element 2 are aligned such that their long axes are oriented in the third direction Z.

FIG. 10 is an illustration for explanation of the transmittance of the display device DSP in the transmission mode shown in FIG. 9. The transmittance of the light traveling from the first polarizing element 1 toward the second polarizing element 2 in the display device DSP will be explained, but the transmittances of the light in opposite directions are substantially equal to each other. In addition, absorption at the dye in each polarizing element in the short axis direction or absorption on the display panel is not considered in the following descriptions on the transmittance.

The pixels PX11 and PX12 included in the display panel 3 are located between the sub-area SA21 of the first polarizing element 1 and the sub-area SA22 of the second polarizing element 2. The retardation $\Delta n \cdot d$ in the pixel PX11 is zero while the retardation $\Delta n \cdot d$ in the pixel PX12 is $\lambda/2$. The pixel PX11 corresponds to the first pixel and the retardation of the pixel PX11 corresponds to the first retardation. The pixel PX12 corresponds to the second pixel and the retardation of the pixel PX12 corresponds to the second retardation. The long axis L1 of the dye 21G and the long axis L2 of the dye 22G are aligned in the third direction Z. In other words, the long axes L1 and L2 are parallel to each other and intersect the X-Y plane (or the main surface of the display device DSP). The dye 21G corresponds to the first dye and the long axis L1 of the dye 21G corresponds to the first long axis. The dye 22G corresponds to the second dye and the long axis L2 of the dye 22G corresponds to the second long axis.

The light transmitted through the first polarizing element 1 (for example, the natural light having a random plane of vibration) is hardly absorbed into the dye 21G of the sub-area SA21 and is made incident on the display panel 3. The component having a plane of vibration, which is part of the light made incident on the display panel 3, is modulated in the pixels PX11 and PX12 but most of the light is not absorbed and made incident on the second polarizing element 2. The light made incident on the second polarizing element 2 is hardly absorbed into the dye 22G of the sub-area SA22 and is transmitted. Since the light made incident on the display device DSP in the transmission mode is thus hardly absorbed into the display device DSP, the transmittance TO of the light transmitted through the display device DSP is equivalent irrespective of the retardations of the pixels PX11 and PX12. For example, the transmittance TO is substantially 100%. In the transmission mode, even if a video signal is written to each pixel to display an image on the display panel 3, the display image is hardly recognized visually and the transmittance is not lowered.

Thus, according to the present embodiments, the transmittance can be enhanced by controlling the first polarizing element 1 and the second polarizing element 2 of the display device DSP in the transmission mode, as compared with a display device comprising an absorption-type static polarizer. In addition, since the transmitted light is hardly absorbed in the display device DSP, the transparency can be enhanced at a portion which needs to be observed through a background via the display device DSP.

FIG. 11 is an illustration for explanation of a display mode applied to the display device DSP of the embodiments.

Each of the first polarizing element 1 and the second polarizing element 2 is controlled in the first mode, and the dye 21G included in the first polarizing element 1 and the dye 22G included in the second polarizing element 2 are aligned in directions perpendicular to each other in the X-Y plane. In the example illustrated, the dye 21G is aligned such that its long axis L1 is oriented in the first direction X, and the dye 22G is aligned such that its long axis L2 is oriented in the second direction Y. In other words, the long axes L1 and L2 intersect each other on the X-Y plane (or the main surface of the display device DSP).

FIG. 12 is an illustration for explanation of transmittance of the display device DSP in the display mode shown in FIG. 11.

First, the transmittance of the light incident on the first polarizing element 1 will be explained. Since the dye 21G is aligned in the first direction X in the first polarizing element 1, a component having a plane of vibration parallel to the first direction X, of the light incident on the first polarizing element 1, is absorbed into the dye 21G and a component having a plane of vibration parallel to the second direction Y is transmitted. For this reason, the transmittance of the light incident on the first polarizing element 1 is approximately 50%. The light transmitted through the first polarizing element 1 becomes linearly polarized light having a plane of vibration in the second direction Y and is made incident on the display panel 3.

The light made incident on the pixel PX11, of the linearly polarized light made incident on the display panel 3, is transmitted through the display panel 3 while maintaining its polarized state since the retardation $\Delta n \cdot d$ of the pixel PX11 is zero. The light made incident on the pixel PX12, of the linearly polarized light made incident on the display panel 3, has the polarization axis rotated, is converted into the linearly polarized light having a plane of vibration in the first direction X, and transmitted through the display panel 3 since the retardation $\Delta n \cdot d$ of the pixel PX12 is $\lambda/2$. The linearly polarized light transmitted through the display panel 3 is made incident on the second polarizing element 2.

Next, the transmittance of the light incident on the second polarizing element 2 will be explained. Since the dye 22G is aligned in the second direction Y in the second polarizing element 2, a component having a plane of vibration parallel to the second direction Y, of the light incident on the second polarizing element 2, is absorbed into the dye 22G and a component having a plane of vibration parallel to the first direction X is transmitted. Since the light transmitted through the pixel PX11 is the linearly polarized light having a plane of vibration in the second direction Y, the light is almost absorbed into the dye 22G. In contrast, since the light transmitted through the pixel PX12 is the linearly polarized light having a plane of vibration in the first direction X, the light is hardly absorbed into the dye 22G. For this reason, the transmittance TL of the light transmitted through the pixel PX11 is smaller than the transmittance TH of the light transmitted through the pixel PX12 in the display device DSP. For example, the transmittance TL becomes substantially zero. In the pixel PX11, black display (Bk) is thereby implemented. In addition, the transmittance TH becomes approximately 50%. In the pixel PX12, white display (W) or the color display is thereby implemented. Therefore, the display image can be visually recognized by writing the video signal to display the image in each pixel PX of the display panel 3, in this display mode.

Thus, according to the present embodiments, the black display can be implemented and the contrast ratio can be enhanced by controlling the first polarizing element 1 and the second polarizing element 2 of the display device DSP in the display mode, as compared with a display device comprising a transmissive spontaneous light-emitting element. For this reason, the display quality can be enhanced.

Next, examples of the present embodiments will be described. In the following examples, only constituent elements necessary for explanations are illustrated.

Figure 13:
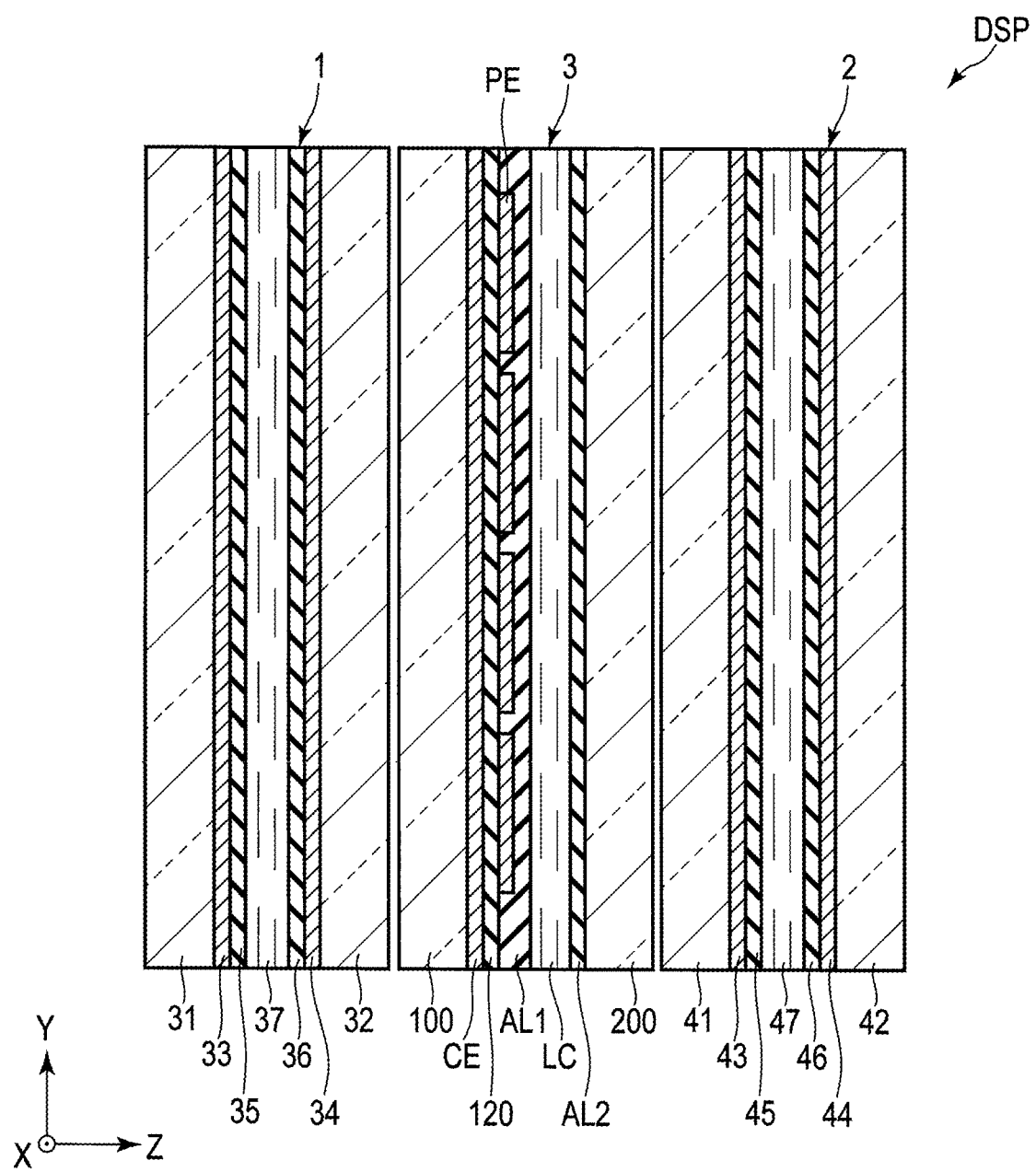
FIG. 13 is a cross-sectional view showing the display device DSP according to an example of the embodiments.

FIG. 13 is a cross-sectional view showing the display device DSP according to an example of the embodiments. The first polarizing element 1 comprises support substrates 31 and 32, a control electrode (first electrode) 33, a control electrode (second electrode) 34, alignment films 35 and 36, and a liquid crystal layer (guest-host liquid crystal layer) 37. The second polarizing element 2 comprises support substrates 41 and 42, a control electrode (first electrode) 43, a control electrode (second electrode) 44, alignment films 45 and 46, and a liquid crystal layer (guest-host liquid crystal layer) 47.

The display panel 3 comprises the first insulating substrate 100, the common electrode CE, the insulating film 120, the pixel electrode PE, the first alignment film AL1, the second insulating substrate 200, the second alignment film AL2, and the light-modulating layer LC. The first insulating substrate 100 is opposed to the support substrate 32. The second insulating substrate 200 is opposed to the support substrate 41. Air layers or transparent members may be interposed between the first insulating substrate 100 and the support substrate 32 and between the second insulating substrate 200 and the support substrate 41 or the insulating substrates and the support substrates may be bonded by an adhesive.

As explained above, the display device DSP capable of enhancing the transmittance and the display quality can be provided by the embodiments.

FIG. 14 is a cross-sectional view showing the display device DSP according to another example of the embodiments. The example shown in FIG. 14 is different from the example shown in FIG. 13 with respect to a feature that the number of substrates is reduced. In the example illustrated, the first polarizing element 1 and the second polarizing element 2 have the same configuration as that in the example shown in FIG. 13, and illustration of the first insulating substrate and the second insulating substrate of the display panel 3 is omitted.

The common electrode CE of the display panel 3 is located on a side opposed to the light-modulating layer LC of a support substrate 32 and is opposed to the pixel electrode PE through an insulating film 120. The second alignment film AL2 of the display panel 3 is located on a side opposed to the light-modulating layer LC of a support substrate 41.

As explained above, the display device DSP capable of enhancing the transmittance and the display quality can be provided by the embodiments. In addition, the number of the components can be reduced, the manufacturing costs can be reduced and the display device DSP can be thinned as compared with the example shown in FIG. 13.

An example of application of the display device DSP of the embodiments will be hereinafter explained. For example, the display device DSP can comprise an lux meter (or an external light sensor) and adjust the transmittance in accordance with brightness of the surrounding, brightness of the background of the display device DSP, and the like. The adjustment of the transmittance can be executed uniformly over the entire area of the active area AA (full dimming) or for each of the sub-areas SA in the active area AA (local dimming). In the local dimming, the visibility can be reduced by assigning gradation of the transmittance to the vicinity of boundaries of the sub-areas SA. In addition, in the image display on the display panel 3, the transmittance can be adjusted to enhance the visibility of the display image. The display device DSP can dim on a necessary area in the active area AA, enlarge or reduce the dimming area, and freely select the shape of the area in accordance with the image taken by a camera.

Figure 15:
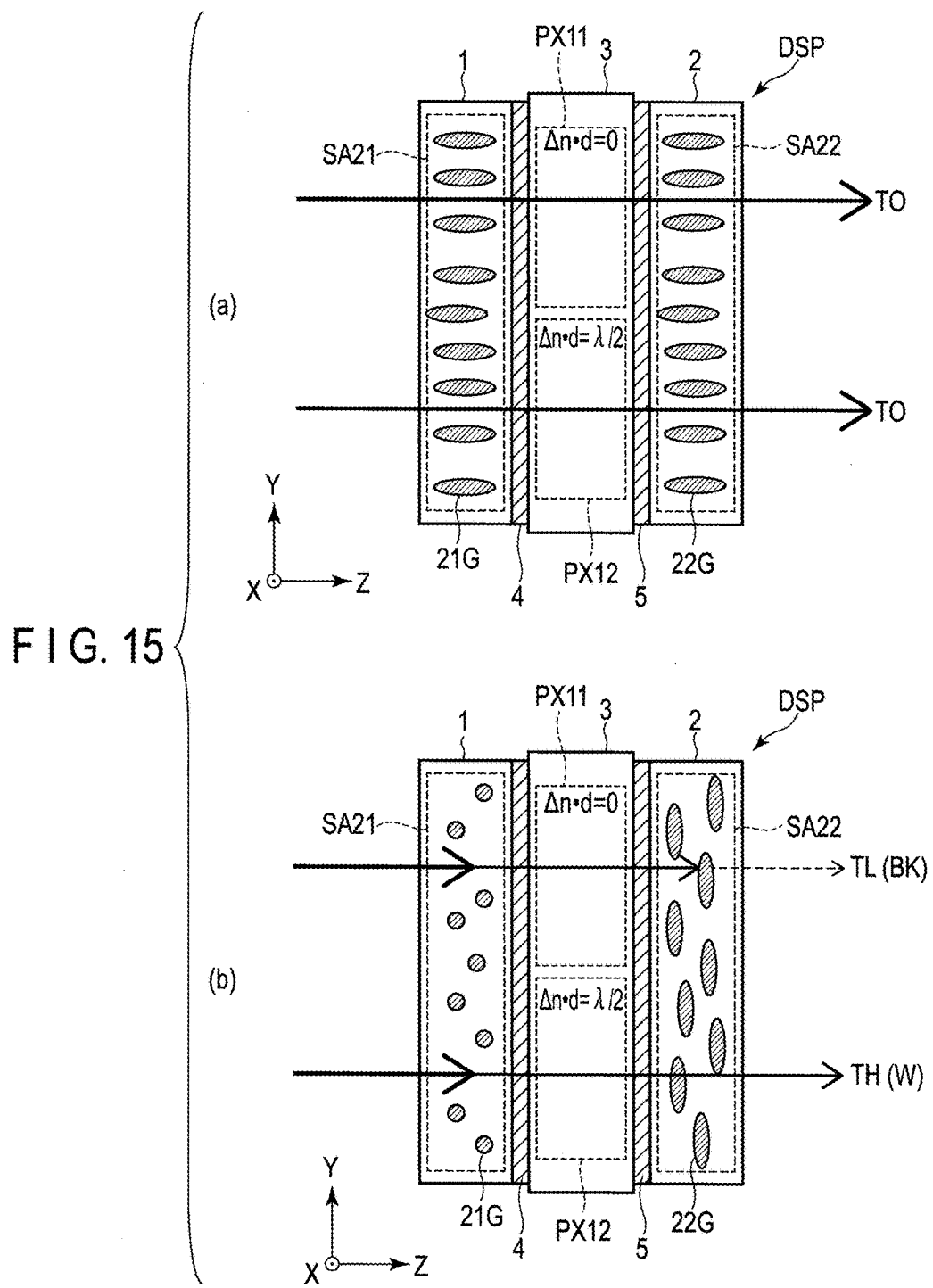
FIG. 15 is a cross-sectional view for explanation of an application example of the display device DSP of the embodiments.

In addition, in an application example shown in FIG. 15(a) and FIG. 15(b), the display device DSP comprises phase difference compensating layers 4 and 5. The phase difference compensating layer 4 is disposed between the first polarizing element 1 and the display panel 3, and the phase difference compensating layer 5 is disposed between the second polarizing element 2 and the display panel 3. When the display device DSP is observed from an oblique direction angled with respect to the third direction Z, the phase difference compensating layers 4 and 5 optically compensate for the phase difference of the light transmitted through the sub-areas of the first polarizing element 1 and the second polarizing element 2 and the pixels of the display panel 3. Even if the display device DSP is observed from the oblique direction, a viewing angle at which high transmittance can be obtained in the transmittance mode shown in FIG. 15(a) can be extended, and a viewing angle at which an image of preferable display quality can be observed in the display mode shown in FIG. 15(b) can be extended. In the example illustrated, the phase difference compensating layers 4 and 5 are disposed on both sides to sandwich the display panel 3. For this reason, even if the position for observing the display device DSP is on the first polarizing element 1 side or the second polarizing element 2 side with respect to the display panel 3, the transmittance and the display quality can be enhanced equally. Only one of the phase difference compensating layers 4 and 5 may be disposed in the display device DSP of the present embodiments and, in this case, the same advantages can be obtained similarly to the case of observing the display device DSP from at least one of the sides.

As explained above, the liquid crystal display device capable of enhancing the display device can be provided by the embodiments.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a first polarizing element;
a second polarizing element; and
a display panel comprising a light-modulating layer located between the first polarizing element and the second polarizing element, wherein
each of the first polarizing element and the second polarizing element comprises a guest-host liquid crystal layer and a control electrode in an active area including at least one sub-area,
the guest-host liquid crystal layer includes dye having anisotropy in absorptive power for visible light,
the control electrode controls an alignment direction of the dye in the sub-area,
the display device has a display mode in which a first axis of the dye of the first polarizing element and a second axis of the dye of the second polarizing element intersect each other in a main surface of the display device, and a transmittance mode in which the first axis and the second axis are parallel to each other and intersect the main surface,
the display panel comprises a first pixel having a first retardation and a second pixel having a second retardation different from the first retardation,
in the display mode, a first transmittance of light transmitted through the first pixel is smaller than a second transmittance of light transmitted through the second pixel, and
in the transmittance mode, a third transmittance of light transmitted through the first pixel is higher than the second transmittance and equivalent to a fourth transmittance of light transmitted through the second pixel.

2. The display device of claim 1, wherein
each of the first polarizing element and the second polarizing element comprises a pair of horizontal alignment films sandwiching the guest-host liquid crystal layer.

3. The display device of claim 2, wherein
the guest-host liquid crystal layer has a positive dielectric anisotropy.

4. The display device of claim 1, wherein
each of the first polarizing element and the second polarizing element comprises a pair of vertical alignment films sandwiching the guest-host liquid crystal layer.

5. The display device of claim 4, wherein
the guest-host liquid crystal layer has a negative dielectric anisotropy.

6. The display device of claim 1, wherein
the control electrode comprises a first electrode and a second electrode, and
the sub-area is located at an overlaid portion of the first electrode and the second electrode.

7. The display device of claim 6, wherein
the first electrode is a single sheet electrode, and
the second electrode includes strip electrodes spaced apart from each other.

8. The display device of claim 6, wherein
the first electrode comprises first strip electrodes spaced apart from each other,
the second electrode comprises second strip electrodes spaced apart from each other,
the first strip electrodes are arranged in a first direction and extend in a second direction intersecting the first direction, and
the second strip electrodes are arranged in the second direction and extend in the first direction.

9. The display device of claim 8, wherein
the sub-areas are arrayed in a matrix in the active area.

10. The display device of claim 1, wherein
the active area includes the sub-areas and a non-control area maintained in the second mode.

11. The display device of claim 1, further comprising:
a drive electrode which drives the light-modulating layer, wherein
the drive electrode comprises a pixel electrode and a common electrode, and
the pixel electrode and the common electrode are formed a transparent conductive material.

12. The display device of claim 11, further comprising:
a switching element connected to the pixel electrode, wherein
the switching element comprises a semiconductor layer formed of a transparent oxide semiconductor.

13. The display device of claim 11, wherein
the light-modulating layer is a liquid crystal layer, and
retardation of the light-modulating layer is adjusted in a range from 0 to $\lambda/2$ in accordance with a magnitude of an electric field between the pixel electrode and the common electrode where $\lambda$ represents a wavelength of light transmitted through the light-modulating layer.

14. A display device comprising:
a first polarizing element comprising first dye having a first long axis;
a second polarizing element comprising second dye having a second long axis; and
a display panel located between the first polarizing element and the second polarizing element,
the display device having a display mode in which the first long axis and the second long axis intersect each other in a main surface of the display device, and a transmittance mode in which the first long axis and the second long axis are parallel to each other and intersect the main surface, wherein
the display panel comprises a first pixel having a first retardation and a second pixel having a second retardation different from the first retardation,
in the display mode, a first transmittance of light transmitted through the first pixel is smaller than a second transmittance of light transmitted through the second pixel, and
in the transmittance mode, a third transmittance of light transmitted through the first pixel is higher than the second transmittance and equivalent to a fourth transmittance of light transmitted through the second pixel.

* * * * *